June 18, 1968  L. A. SAYCE  3,388,735
GRAZING INCIDENCE DIFFRACTION GRATINGS
Filed March 25, 1964  2 Sheets-Sheet 1

United States Patent Office 3,388,735
Patented June 18, 1968

1

3,388,735
GRAZING INCIDENCE DIFFRACTION
GRATINGS
Leonard A. Sayce, Glasgow, Scotland, assignor to National Research Development Corporation, London, England, a British body corporate
Filed Mar. 25, 1964, Ser. No. 355,151
Claims priority, application Great Britain, Mar. 28, 1963, 12,406/63
6 Claims. (Cl. 164—47)

ABSTRACT OF THE DISCLOSURE

Preparing grazing incidence diffraction gratings for "soft" X-rays by providing a support having an optically finished surface with a series of firmly adherent solid parallel strips alternating with exposed strips of the optically finished surface between them at the desired line spacing to thereby produce a structure presenting a surface pattern in relief, and thereafter making negative casts of said pattern using the structure as a mold to produce the grazing incidence diffraction gratings.

---

The analysis of "hard" X-rays is commonly performed by the diffraction produced by crystalline materials.

For the analysis of "soft" X-rays, 20 A.–600 A. in wavelengths, crystalline materials of suitable lattice spacing are not available and it is customary to use ruled gratings upon which the incident X-rays are directed at nearly grazing incidence. Such "grazing incidence diffraction ratings" have hitherto been ruled mechanically upon glass or metal surfaces but they have proved inefficient in that the useful diffracted energy has been a very small proportion of the incident energy. This is because a grating for the purpose in question should consist either of strips as near perfect as possible of reflecting surface, lying in a common plane, cylindrical, spherical or other regular surface, separated by furrows of rounded e.g. semi-circular section (the "furrowed" type) or better still of strips as near perfect as possible of reflecting surface, lying in a common plane, cylindrical, spherical or other regular surface, alternating with strips as near perfect as possible of reflecting surface lying in another regular surface parallel with the first (the phase type), whereas the direct action of the ruling tool upon an optically finished surface of a workpiece throws up debris and deforms the shape of the unruled strips between strips actually engaged by the tool by reason of the adjacent disturbances.

An object of the present invention is the preparation of grazing incidence diffraction gratings having a higher efficiency than those hitherto commonly available.

The invention employs indirect methods i.e. no part of the final grating and no part of a master grating from which copies are derived is subjected to a mechanical ruling operation by a ruling tool engaging an optically finished surface. Instead operations are performed on the optically finished surface which provide it with a series of firmly adherent solid parallel strips alternating with exposed strips of the optically finished surface at the desired line spacing, thus producing a structure presenting a surface pattern in relief and this structure is generally used to prepare therefrom a negative cast of the surface pattern, though in some cases the aforesaid surface pattern can constitute the required grating. The exposed strips of the optically finished surface or the corresponding surfaces of the cast constitute high quality reflecting surfaces, undisturbed by ruling tool action, and as will be seen, in the case of "phase" gratings made according to the invention the same applies to the intervening strips.

The invention consists primarily in certain complete sequences of steps which result in the improved grazing incidence diffraction gratings, these sequences including steps which are individually known for other purposes connected with diffraction gratings. The structure from which the negative cast is prepared may be made by ruling a coating of metal on the optically finished surface followed by an etching process which removes the whole of the metal from the strips to be exposed, or it may be made by photography from an existing mechanically ruled grating, using photographic resist strips of which are completely removed during development to leave the exposed strips, or the pattern so obtained may be used to prepare a reversal which constitutes the structure from which the negative case is prepared. Such a reversal may be made by coating the pattern with metal which adheres to the support and then etching away the pattern thus taking away that part of the coating which is on the pattern and leaving the rest adhering to the support. A negative cast may be made from any of these structures by coating the surface pattern of the structure with a material capable of providing a surface of the requisite quality and which does not adhere to the pattern or support and stripping it by an adhesive on a backing.

In a modification the structure made by ruling and etching or by photography, may have the exposed strips etched to form grooves, the adherent strips between the grooves then being removed to leave a structure from which negative casts can be made.

The invention will be further described in greater detail with reference to the accompanying drawings which are cross sections illustrating the sequences of steps in several different methods in accordance with the invention. In view of the nature of the subject the drawings are necessarily highly diagrammatic with the thickness and widths grossly exaggerated.

For convenience a generally plane grating has been assumed but as will be explained the invention is not limited thereto.

Figure 8:
Figure 9:
Figure 10:
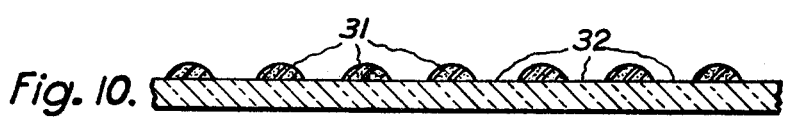

FIGURES 8, 9 and 10 illustrate steps of the third method which are comon to both forms of this method and precede those of FIGURES 4 and 5 and 6 and 7.

FIGURES 11 to 15 illustrate steps of the fourth method.

(1) In the first method, the object is to produce upon an optically polished surface a succession of evenly-spaced parallel grooves or furrows free from the unwanted disturbance to the surface inevitably caused by any process of direct mechanical ruling. The method consists of the following sequence of operations, the first three of which are known per se. See Russudova and Gerasimov, Optics and Spectroscopy XI, No. 2, August 1961, p. 136, Optical Society of America.

Figure 1:
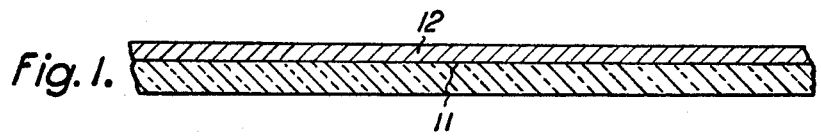
FIGURES 1 to 3 illustrate steps which are common to the first and second methods to be described.

(a) A surface 11 shown plane, but which may be cylindrical or spherical according to need, of optically polished glass is vacuum-coated with a uniform layer 12 of aluminium which adheres strongly to the glass surface (FIGURE 1). Typically for a 10,000 lines per inch (400 lines per mm.) grating, the aluminium thickness should be about 1.3 microns.

Figure 2:
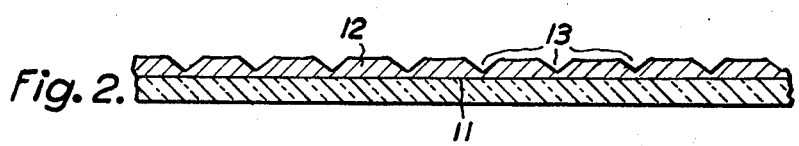

(b) The aluminised surface is ruled by a diamond tool in a conventional difffraction grating ruling machine. The grooves 13 in the aluminium coating are made V-shaped in cross-section (FIGURE 2) and the tool is so weighted that the bottom of each groove approaches but does not touch the glass substrate. This method of forming the groove results in the metal underlying the grooves being work hardened.

(c) The ruled surface is treated with a dilute solution of a solvent for aluminium (N/100 sodium hydroxide is suitable). The solvent acts preferentially upon the work-hardened portions of the aluminium and exposes clear strips 14 (FIGURE 3) of the underlying glass substrate. The solvent is allowed to act until these clear strips, separated by strips 15 of undissolved aluminium, occupy about 50 percent of the total surface. The solvent action also tends to concentrate on the corner of the section so that as shown the strips 15 are of rounded section. The remaining stages of the method also known in themselves in connection with other types of grating are for the purpose of deriving an inverse replica or negative cast of this surface pattern or structure.

(d) The above-prepared structure is vacuum-coated with a layer 16 (FIGURE 4) of gold; the gold film may be prepared by evaporation or cathode sputtering and is typically 1000 A. thick. The gold-coated surface is then cemented to a glass or metal backing-plate 17 by means of an epoxy or similar polymerising adhesive indicated at 18, the backing-plate 17 being allowed to overlap the original surface 11 along at least one edge as at 19 and be overlapped by the latter on at least one other edge as at 21.

Figure 5:
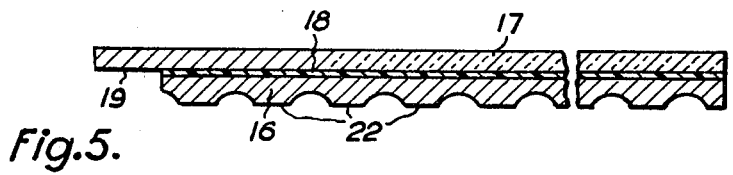
Figure 6:
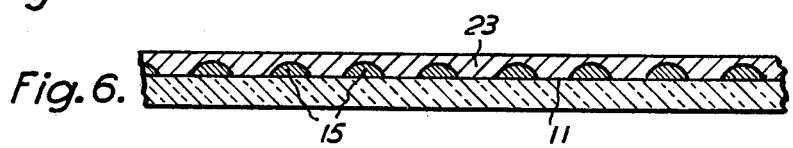
FIGURES 6 and 7 illustrate two further steps of the second method and another form of the third method.
Figure 7:
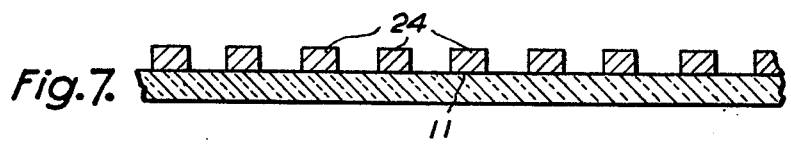

(e) When the epoxy adhesive has completely hardened, the prepared structure 11 and the backing-plate 17 are forced apart by applying strong opposing forces to the overlapping edges 19, 21. As shown in FIGURE 5 the backing-plate 17 now bears a layer 16 of gold containing alternate high quality flat-topped strips 22 (derived from the exposed glass surface strips 14) and furrows (derived from the undissolved aluminum of stage "c" above) and constitutes the finished X-ray grating. Further X-ray gratings may be prepared from the same original surface pattern or structure by a repetition of stages (d) to (e).

(2) In the second method, the object is to produce upon an optically polished surface a succession of evenly-spaced parallel strips each raised above the surface by a small and constant distance; the whole constituting a "phase" grating. By suitable choice of the elevation of the strips and the ratio of their area to that of the exposed substrate it can be arranged that both the "high" and the "low" surfaces of the grating contribute equal amounts of energy to the diffracted beams at any given range of wavelengths. The method consists of the following sequence of known operations known individually.

Figure 3:
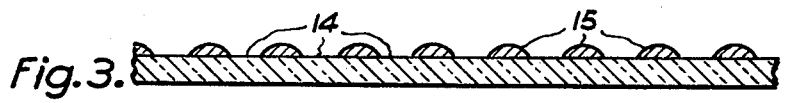

(a), (b) and (c) are as described under 1(a), 1(b) and 1(c) above and result in a structure comprising an optically polished glass surface 50 percent of whose surface is covered by evenly-spaced parallel rounded-section strips 15 of aluminium, as shown in FIGURE 3.

(d) The aboveproposed structure is vacuum-coated with a thin layer 23 of chromium which adheres strongly to the glass. The thickness of this chromium film must be closely controlled to a value governed by the pitch of the grating and the wave-length of the radiation to be examined since it determines the phase difference between the reflected rays from adjacent surfaces. Also the chromium must have an outer surface of the requisite quality parallel to the surface 11. It is then immersed in a strong solution of a solvent for aluminium in which chromium is insoluble (sodium hydroxide solution has been found suitable). As a result, the solvent penetrates to the aluminum strips 15 by diffusion through the chromium and, in dissolving it, detaches the overlying chromium leaving the remainder of the chromium unaffected in the form of strips 24 (FIGURE 7) strongly adhering to the glass.

Figure 4:
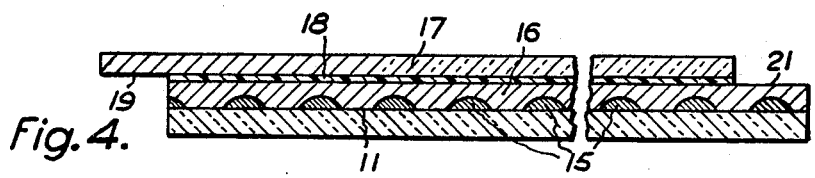
FIGURES 4 and 5 illustrate two further steps of the first method, the second method, one form of the third method, and which can be used in another form of the third method and in the fourth method.

The result of the above sequence of operations may be used as the finished X-ray grating but negative casts of it may be made by the steps described under 1(d) and 1(e) above with reference to FIGURES 4 and 5. By repeating these steps a number of identical copies can be prepared from one original "master" grating.

(3) In the third method, the object is to prepare an efficient X-ray grating from an existing mechanically-ruled grating by photographic means. By suitable modification, the method may be adapted to produce gratings either of the "furrowed" type (as in Method 1 above) or the "phase" type (as in Method 2 above). The method consists of the following sequence of operations known individually.

(a) A transparent copy of an existing mechanically-ruled plane grating is prepared by any convenient method suitably that described by Dew and Sayce (Proc. Roy. Soc. A, vol. 207, 1951, p. 278). Such a copy has a cross section exemplified by FIGURE 8 i.e. V grooves 25 with flat strips 26 between, but it will have reproduced in it the imperfections above mentioned of a mechanically ruled grating.

(b) The transparent copy is photographed upon an optically plane and polished glass surface coated with a strongly adherent thin and uniform layer of "photographic resist." Suitable "resists" are e.g. dichromated colloids such as fish glue, albumen and polyvinyl alcohol and photosensitive resins. By appropriate spacing between the grating and the resist-coated glass plate, a Fresnel diffraction image is formed thereon, indicated by the strips 27 of dark shading in FIGURE 9, in which 28 is the glass support and 29 the layer of resist, and in this step the imperfections of the original will have little effect. It will be understood that exposure does not actually darken the resist but varies its solubility, and the shading is merely intended to give an idea of the distribution of the exposure.

(c) The photographic copy, after development which dissolves away the unwanted parts of the resist, consists of alternate strips 31, 32 (FIGURE 10) of remaining photo-resist and clear glass. The development rounds off the section of the strips of resist which are left, while the exposed glass surface is unaffected in quality by the photographic operations so that the effect of imperfections in the original grating due to mechanical ruling have now been entirely eliminated. In section the copy at this stage resembles that shown in FIGURE 3 and it may be treated in one of two alternative ways:

(d1) Either a gold cast is made of the surface pattern of the above-prepared structure shown in FIGURE 10 by the processes described under 1(d) and 1(e) above the reference to FIGURES 4 and 5, resulting in a grating of the "furrowed" type.

(d2) Or the above-treated surface shown in FIGURE 10 is vacuum-coated with a thin layer of chromium whose thickness is governed by similar consideration to those set out above under 2(d). The resulting section is similar to that of FIGURE 6. It is then immersed in a solvent such as a solution of potassium hydroxide in ethyl alcohol for the remaining photo-resist which does not dissolve chromium but penetrates the overlying layer of chromium by diffusion, and dissolves the remaining photo-resist which together with the overlying chromium, can then be removed by gentle rubbing with a pad of cotton-wool. This results in a grating of the "phase" type consisting of alternate flat strips of chromium and of glass, of similar section to that shown in FIGURE 7. Negative casts can be made from this as above described under 1(d) and 1(e).

(4) In the fourth method, the object is to produce upon an optically polished surface of glass a succession of evenly-spaced parallel grooves by controlled etching of the glass. The method consists of the following sequence of operations individually known.

Figure 11:
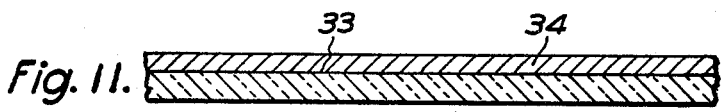

(a) A surface 33 shown plane, but which might be cylindrical or spherical according to need, of polished glass is vacuum-coated with a uniform layer 34 of lead (or other material resistant to hydrofluoric acid (FIGURE 11).

Figure 12:

(b) The lead-coated surface is ruled as described under 1(b) above, the resulting V-grooves being marked 35 in FIGURE 12.

Figure 13:

(c) The ruled surface is treated with a dilute solution of a solvent for lead (e.g. dilute nitric acid) until the lead covering has been removed from about 50 percent of the total surface, leaving alternate strips 36, 37, FIGURE 13, of clear glass and rounded section lead.

Figure 14:

(d) The surface is treated with a dilute solution of hydrofluoric acid for a period (found by previous test) which lowers the level of the exposed glass surface by the required amount, thus producing grooves 38, FIGURE 14.

Figure 15:

(e) The hydrofluoric acid solution is replaced by dilute nitric acid which is allowed to act for a period sufficient to remove the remaining lead strips, thus leaving the section shown in FIGURE 15 in which flat strips 39 in one plane alternate with grooves 38.

The product of these operations may be used as the required diffraction grating or it may be used as a "master" for the preparation of negative casts by employing the steps described under 1(d) and 1(e) above.

In all cases above described in which gold is referred to any other metal which is non-adherent to glass and aluminium or hardened photographic resist, e.g. silver may be used. It may also be possible to use other materials in place of aluminium, chromium and lead provided the substitutes have the requisite properties to give the required results.

It should be pointed out that in the case of the methods described under 2(a to d), 3(a to c and d2) and 4(a to c) involve first preparing a surface pattern consisting of adherent strips with exposed strips of the optically finished surface of the substrate between them and then producing a reversal of the surface pattern on the original substrate, the adherent stops being removed so that the strips of the optically finished surface which they originally covered are exposed, while the originally exposed strips are covered or etched away. This reversal is a negative of the surface pattern first produced but instead of being a negative cast it is produced on the original substrate. It can itself constitute the grating to be made and any number can be made by repeating the operation on fresh substrates. But it is usually more convenient and economical to use the reversal as a master from which further negative casts can be made. The fact that there is a further reversal is of no importance in the case of methods 2(a to d) and 3(a to c and d2) because the production of a reversal only applies to "phase" gratings in which both sets of strips are optically active and similar. In the case of method (4) a further reversal would be necessary before taking negative casts.

What I claim is:

1. A method of preparing a grazing incidence diffraction grating for "soft" X-rays which includes the steps of providing a support having an optically finished surface, with a series of firmly adherent solid parallel metal strips alternating with exposed strips of the optically finished surface between them at the desired line spacing, thus producing a structure presenting surface pattern in relief, and thereafter making negative metal casts of said pattern using said structure as a mould to produce grazing incidence gratings.

2. A method of preparing a grazing incidence diffraction grating for "soft" X-rays which includes the steps of providing a support having an optically finished surface, with a series of firmly adherent solid parallel metal strips, alternating with exposed strips of the optically finished surface between them at the desired line spacing, thus producing a structure presenting a surface pattern in relief, coating said pattern with a layer of material capable of providing a reflecting surface of the required quality which does not adhere to the constituents of said pattern, cementing a backing plate on to said layer, and thereafter separating said backing plate with said layer cemented thereto from said pattern to produce a grazing incidence grating as a negative metal cast of said pattern.

3. A method as set forth in claim 2 in which the material coated on the surface pattern is gold or silver.

4. A method as set forth in claim 2 wherein the backing plate overlaps one edge of the surface pattern and the opposite edge of the surface pattern overlaps the backing plate.

5. A method of preparing a grazing incidence diffraction grating for "soft" X-rays which includes the steps of providing a support having an optically finished surface, with a series of firmly adherent solid parallel metal strips alternating with exposed strips of the optically finished surface between them at the desired line spacing, thus producing a structure presenting a surface pattern in relief, said parallel strips being made of a material which resists an etching agent for said support; etching said exposed strips with said etching agent and then removing said parallel strips, thus producing a further structure presenting a surface pattern in relief to serve as a first mould; making from said first mould a first negative metal cast of the pattern thereof to serve as a second mould; and making from said second mould a second negative cast of the pattern thereof to produce a grazing incidence grating.

6. A method as set forth in claim 5 in which the optically finished surface is of glass and the material of the adherent strips is lead.

References Cited

UNITED STATES PATENTS

| | | | |
|---|---|---|---|
| 818,966 | 4/1906 | Ives | 350—162 |
| 2,232,551 | 12/1936 | Merton | 264—1 |
| 2,464,738 | 3/1949 | White et al. | 264—1 X |
| 1,744,642 | 1/1930 | Kondo | 96—38.3 |
| 1,922,434 | 8/1933 | Gundlach | 96—38.3 |
| 1,952,787 | 3/1934 | Bennett | 96—35 |
| 2,585,700 | 2/1952 | Strickman | 96—36.2 |
| 3,079,849 | 3/1963 | Wareham | 96—76 |
| 2,447,836 | 8/1948 | Beeber et al. | 96—36 |

FOREIGN PATENTS 817,051   7/1959   Great Britain.

OTHER REFERENCES

Rassulova and Gerasimov, Optics and Spectroscopy XI, No. 2, August 1961, p. 136, Optical Society of America.

NORMAN G. TORCHIN, *Primary Examiner.*

R. E. MARTIN, *Assistant Examiner.*